United States Patent Office 2,734,877
Patented Feb. 14, 1956

2,734,877

ACCELERATION OF THE DIMETHYLOL PHENOL CURE OF BUTYL RUBBER BY MEANS OF POLYCHLOROPRENE

Harvey J. Batts and Theodore G. Delang, Indianapolis, Ind., assignors to United States Rubber Company, New York, N. Y., a corporation of New Jersey No Drawing. Application June 18, 1952,
Serial No. 294,268

4 Claims. (Cl. 260—19)

This invention relates to a process for vulcanizing Butyl rubber, and more particularly it relates to a process for accelerating the vulcanization of Butyl rubber with phenolic resins.

Copending application of Tawney and Little, Serial No. 266,146, filed January 12, 1952, now Patent No. 2,701,895 and assigned to the same assignee as the instant application, discloses and claims the vulcanization of Butyl rubber with, inter alia, phenolic resins. It has been desired to render the vulcanization of Butyl rubber with phenolic resins more convenient and more economical, by reducing the time and temperature necessary to attain a practical cure by this method. Accordingly, the principal object of the present invention is to provide a method of accelerating the aforesaid vulcanization process.

The invention is based on the unexpected discovery that if a relatively small amount of neoprene synthetic rubber, and more especially a small amount of neoprene synthetic rubber and a zinc compound, is present in the vulcanizable mix of Butyl rubber and phenolic resin, the curing process is remarkably accelerated, and excellent cures are obtained in a considerably shorter time, or at lower temperature, than would otherwise be possible.

Butyl rubber, as is well known, is a commercially available type of synthetic rubber made by copolymerizing an isoolefin, usually isobutylene, with a minor proportion of a polyunsaturate having from 4 to 14 carbon atoms per molecule, which is usually a conjugated diolefin, such as isoprene or butadiene. The isoolefins used generally have from 4 to 7 carbon atoms, and such isomonoolefins as isobutylene or ethyl methyl ethylene are preferred. The diolefins employed usually are ordinary open-chain conjugated diolefins having from 4 to 6 carbon atoms, among which may be mentioned, in addition to the commonly used isoprene or butadiene, such compounds as piperylene; 2,3-dimethyl butadiene-1,3; 3-methyl-1,3-pentadiene; 2-methyl-1,3-pentadiene; 1,3-hexadiene; 2,4-hexadiene. The Butyl rubber contains only relatively small amounts of copolymerized diene, typically from about 0.5 to 5%, and seldom more than 10%, on the total weight of the elastomers. For the sake of convenience and brevity, the various possible synthetic rubbers within this class will be designated generally by the term Butyl rubber.

Suitable phenolic resins for use as vulcanizing agents in the invention are the oil-soluble heat-reactive phenolic resins, that is, the resol type of phenolic resin. Phenolic resins of this type are known materials, and they are most frequently substances which may be identified as polymeric phenol dialcohols. They are soluble in conventional organic solvents, in drying oils, and in Butyl rubber. Suitable resins may be made, for example, from substituted phenols and formaldehyde in the presence of alkali, as shown by Honel in U. S. Patent 1,996,069 or Charlton et al., in U. S. Patent 2,364,192, and others, and by modifications which are well known. Carswell, in "Phenoplasts," published by Interscience Publishers, New York, 1950, discusses on pp. 17–22 the formation of polymeric phenol dialcohols from para substituted phenols and aldehydes. The vulcanizing agents employed in the invention are usually mixtures of the compounds shown in Carswell to be formed by heating monomeric phenol dialcohols. While the individual polymeric phenol dialcohols can be used in the invention they are not usually easy to make in a pure state. It is preferred to use the mixture of compounds because they act as effectively as the individual compounds and they are much cheaper. The preferred phenolic resins for use in the invention are those in which the para substituent on the phenolic nucleus is a hydrocarbon radical, and more especially an alkyl radical. Most preferred are those compounds in which the alkyl group is a tertiary butyl group or an octyl group. Examples of suitable phenolic resins for use in the invention are the polymers of the following:

2,6-dimethylol-4-methyl phenol
2,6-dimethylol-4-tert. butyl phenol
2,6-dimethylol-4-octyl phenol
2,6-dimethylol-4-dodecyl phenol
2,6-dimethylol-4-phenyl phenol
2,6-dimethylol-4-benzyl phenol
2,6-dimethylol-4-(alpha, alpha-dimethylbenzyl) phenol
2,6-dimethylol-4-cyclohexyl phenol The amount of phenolic resin used in the invention is preferably within the range of from about 4 to 15 parts by weight to 100 parts of the Butyl rubber. While smaller amounts may be used, e. g., 3 parts, it is usually found that less than this amount is insufficient to produce a practical cure within a reasonable time. Also, larger amounts may be used, e. g., 20 parts, but larger amounts are without further advantage.

In the present vulcanizing process, there is added to the mixture of Butyl rubber and phenolic resin, a small but effective amount of neoprene synthetic rubber as an accelerator. The neoprene is a well known type of synthetic rubber, also known as polychloroprene. It is found that as little as 1 part by weight of neoprene per 100 parts of Butyl rubber exerts appreciable accelerating effect, but it is generally preferred to employ somewhat more than this, generally from about 3 to 5 parts for optimum accelerating effect. However, substantially greater amounts, e. g., 10 or 15 parts, should not generally be greatly exceeded because such larger amounts have a definite tendency to produce a hard and stiff product, unsuited for many uses.

The foregoing vulcanizable mixture of raw Butyl rubber, phenolic resin vulcanizing agent, and neoprene accelerator, is usually compounded with a quantity of suitable reinforcing material, preferably carbon black. Although from at least about 20 to 100 parts by weight of carbon black may be employed per 100 parts of Butyl rubber, it is generally preferred to use from about 40 to 80 parts of black, and most preferably about 50 or 60 parts. Other compounding ingredients, such as fillers, processing aids, etc., may be included in the mixture if desired.

The Butyl rubber and additional ingredients may be mixed together in any desired order according to the procedures ordinarily used in mixing rubber compounds, with the aid of the usual rubber mixing equipment such as a Banbury mixer or roll mills.

The vulcanizable mixture resulting from the foregoing ingredients may be fabricated into the desired form by the usual methods, such as calendering, extrusion, or molding, and subsequently vulcanized by heating, preferably while confined under pressure. The vulcanization is conveniently carried out at temperatures within the range from about 300° F. to 390° F., for periods of time ranging from about ¼ to 2 hours, the longer periods of time within the stated time range being employed with the lower temperatures.

It is found that the accelerating effect of the neoprene on the butyl-phenolic resin vulcanizate is greatly enhanced if a small amount of a zinc compound, usually zinc oxide or its known equivalent, such as a zinc salt of a fatty acid, is also present in the mixture. As little as 1 part by weight of zinc oxide or its equivalent per 100 parts of butyl definitely increases the accelerating effect of the neoprene, while amounts as great as from 2.5 to 5 parts of zinc oxide produce a very marked effect. For most purposes, there is generally no advantage in using more than 10 or 15 parts of zinc oxide to aid the neoprene acceleration.

The following examples will serve to illustrate the invention in more detail. All parts are expressed by weight.

*Example I*

| Ingredients | I-A | I-B |
|---|---|---|
| | Parts | Parts |
| Butyl rubber (GR-1) | 100.00 | 90.00 |
| Neoprene | | 10.00 |
| Carbon black | 60.00 | 60.00 |
| Amberol ST-137 resin | 12.00 | 12.00 |

The Amberol ST-137 resin is a commercial preparation of phenolic resins believed to be in the nature of a reaction product of formaldehyde with para-octyl phenol in an alkaline medium. It is a solid material. These ingredients were mixed together and divided into separate portions which were cured in a mold for various times at a temperature of 350° F. The tensile strength and modulus of the resulting vulcanizates was then determined, with the following results:

| Time of Cure at 350° F., min. | I-A | | I-B | |
|---|---|---|---|---|
| | Tensile p.s.i. | 300% Modulus, p.s.i. | Tensile, p.s.i. | 300% Modulus, p.s.i. |
| 10 | no cure | no cure | 885 | 505 |
| 15 | 1,185 | 585 | 1,420 | 930 |
| 30 | 2,060 | 1,110 | 1,785 | 1,270 |
| 45 | 2,280 | 1,480 | 1,805 | 1,420 |

It will be evident from the foregoing data that the mixture I-B containing the neoprene as an accelerator attained its optimum state of cure much more rapidly than the mixture I-B containing no neoprene.

*Example II*

An experiment similar to Example I was performed, employing zinc oxide along with the neoprene, with the results noted in the following table:

| Ingredients | II-A | II-B | II-C |
|---|---|---|---|
| | Parts | Parts | Parts |
| GR-1 | 100.00 | 90.00 | 90.00 |
| Neoprene | | 10.00 | 10.00 |
| Carbon black | 60.00 | 60.00 | 60.00 |
| Zinc oxide | | 2.50 | 5.00 |
| Amberol ST-137 | 12.00 | 12.00 | 12.00 |

| Time of Cure at 350° F., min. | Properties | | | | | |
|---|---|---|---|---|---|---|
| | Tensile | Modulus | Tensile | Modulus | Tensile | Modulus |
| 5 | no cure | no cure | semi-cure | semi-cure | semi-cure | semi-cure |
| 10 | no cure | no cure | 830 | 460 | 990 | 545 |
| 15 | no cure | no cure | 1,465 | 815 | 1,365 | 785 |
| 30 | 1,675 | 625 | 1,700 | 1,265 | 1,770 | 1,225 |

It will be apparent from the foregoing data that the stock II-B and II-C containing increasing amounts of zinc oxide along with the neoprene were very much accelerated, compared to the stock II-A containing neither of these materials.

*Example III*

This example, performed similarly to Example I, shows that zinc oxide alone will not produce the desired acceleration of the phenolic resin vulcanized butyl, if neoprene is not present.

| Ingredients | III-A | III-B |
|---|---|---|
| | Parts | Parts |
| GR-1 | 100.00 | 100.00 |
| Carbon black | 60.00 | 60.00 |
| Amberol ST-137 | 12.00 | 12.00 |
| Zinc oxide | | 5.00 |

| Time of Cure at 350° F., min. | Properties | | | |
|---|---|---|---|---|
| | Tensile | Modulus | Tensile | Modulus |
| 10 | 1,060 | 360 | no cure | no cure |
| 15 | 1,290 | 440 | 1,350 | 430 |
| 20 | 1,685 | 600 | 1,750 | 550 |
| 30 | 2,170 | 930 | 2,080 | 850 |
| 45 | 2,340 | 1,200 | 2,200 | 1,040 |

Stock III-B containing the zinc oxide did not cure as rapidly as stock III-A containing no zinc oxide.

*Example IV*

This example shows that neoprene has no accelerating effect on a typical sulfur cure of butyl, even if substantial zinc oxide is present.

| Ingredients | IV-A | IV-B |
|---|---|---|
| | Parts | Parts |
| GR-1 | 100.00 | 97.00 |
| Neoprene | | 3.00 |
| Carbon black | 50.00 | 50.00 |
| Zinc oxide | 22.50 | 22.50 |
| Stearic acid | 2.00 | 2.00 |
| Bardol oil | 10.00 | 10.00 |
| Tuex | .90 | .90 |
| Monex | .90 | .90 |
| Sulfur | 1.80 | 1.80 |

| Time of Cure at 330° F., min. | Properties | | | |
|---|---|---|---|---|
| | Tensile | Modulus | Tensile | Modulus |
| 3 | no cure | no cure | no cure | no cure |
| 5 | 1,860 | 165 | 1,615 | 165 |
| 10 | 2,440 | 355 | 2,040 | 320 |
| 15 | 2,420 | 435 | 2,210 | 410 |

In view of the foregoing it was most unexpected to find that neoprene accelerates the phenolic resin cure of butyl, since no such acceleration is found with sulfur cure of butyl.

The following example illustrates the practice of the invention with a zinc salt of a fatty acid, viz., zinc stearate, in place of zinc oxide.

Example V

|  | V-A | V-B |
|---|---|---|
| GR-1 18 | 90.00 | 90.00 |
| Neoprene W | 10.00 | 10.00 |
| Philblack O | 60.00 | 60.00 |
| Amberol ST-137 Resin | 12.00 | 12.00 |
| Zinc Stearate | | 5.00 |

|  | Time of Cure at 350° F. | | |
|---|---|---|---|
| Tensile | 5' | 555 | 1,270 |
|  | 10' | 1,050 | 1,785 |
|  | 15' | 1,325 | 1,925 |
|  | 30' | 1,750 | 2,140 |
| Elong | 5' | 940 | 760 |
|  | 10' | 780 | 610 |
|  | 15' | 610 | 540 |
|  | 30' | 500 | 440 |
| 300% Mod | 5' | 290 | 505 |
|  | 10' | 540 | 950 |
|  | 15' | 700 | 1,250 |
|  | 30' | 1,140 | 1,650 |

The invention therefore provides a highly advantageous method for curing butyl rubber, wherein it is possible to make useful articles from butyl rubber, such as hose, inner tubes, curing bags, tires, and the like, using the phenolic resin cure, in a shorter time than has heretofore been possible.

Having thus described our invention, what we claim and desire to protect by Letters Patent is:

1. In the method of vulcanizing a rubbery copolymer of an isoolefin having from 4 to 7 carbon atoms with from 0.5 to 10% of a conjugated diolefin having from 4 to 14 carbon atoms by heating the said rubbery copolymer in admixture with a resinous 2,6-dimethylol-4-hydrocarbon substituted phenol as the vulcanizing agent, the improvement which comprises the step of accelerating the said vulcanization by carrying out the said vulcanization in the presence of from 1 to 15 parts of rubbery polychloroprene, per 100 parts of said rubbery copolymer.

2. In the method of vulcanizing a rubbery copolymer of an isoolefin having from 4 to 7 carbon atoms and from 0.5 to 10% of a conjugated diolefin having from 4 to 14 carbon atoms by heating the said rubbery copolymer in admixture with a resinous 2,6-dimethylol-4-alkyl phenol as the vulcanizing agent, the improvement which comprises the step of accelerating the said vulcanization by carrying out the said vulcanization in the presence of from 1 to 15 parts of rubbery polychloroprene and at least 1 part of a zinc compound, per 100 parts of the said rubbery copolymer.

3. In the method of vulcanizing a rubbery copolymer of isobutylene and from 0.5 to 10% of isoprene by heating the said rubbery copolymer in admixture with a resinous 2,6-dimethylol-4-alkyl phenol as the vulcanizing agent, the improvement which comprises the step of accelerating the said vulcanization by carrying out the said vulcanization in the presence of from 1 to 15 parts of rubbery polychloroprene, and at least 1 part of zinc oxide, per 100 parts of said rubbery copolymer.

4. In the method of vulcanizing a rubbery copolymer of isobutylene with from 0.5 to 10% of isoprene by heating the said rubbery copolymer in admixture with a resinous 2,6-dimethylol-4-alkyl phenol as the vulcanizing agent, the improvement which comprises the step of accelerating the said vulcanization by carrying out the said vulcanization in the presence of from 1 to 15 parts of rubbery polychloroprene, and at least 1 part of zinc stearate, per 100 parts of the said rubbery copolymer.

References Cited in the file of this patent

UNITED STATES PATENTS

| 2,541,550 | Sarbach et al. | Feb. 13, 1951 |
| 2,611,758 | Sarbach | Sept. 23, 1952 |
| 2,649,431 | Little | Aug. 18, 1953 |
| 2,649,432 | Little | Aug. 18, 1953 |

OTHER REFERENCES

Serial No. 357,662, Wildschut (A. P. C.), published April 20, 1943.